United States Patent [19]

Fichter

[11] 4,334,750
[45] Jun. 15, 1982

[54] FILM ASSEMBLAGE HAVING FILM RELEASABLY ATTACHED TO FILM SPOOL

[75] Inventor: Peter K. Fichter, Canton, Mass.

[73] Assignee: Polaroid Corporation, Cambridge, Mass.

[21] Appl. No.: 220,909

[22] Filed: Dec. 29, 1980

[51] Int. Cl.³ .................... G03B 17/26; B65H 75/28
[52] U.S. Cl. .................... 354/275; 242/74.2
[58] Field of Search .................... 242/71, 71.1, 71.2, 242/71.6, 71.7, 71.8, 74, 74.1, 74.2; 354/202, 212–215, 217, 218, 275

[56] References Cited

U.S. PATENT DOCUMENTS

| | | | |
|---|---|---|---|
| 1,930,144 | 10/1933 | Lee | 242/74 |
| 2,481,665 | 9/1949 | Henne | 242/74.2 |
| 3,550,877 | 12/1970 | Sutliff et al. | 242/180 |
| 3,602,451 | 8/1971 | Dolby | 242/74.2 |
| 3,978,495 | 8/1976 | Warscheit | 354/5 |
| 4,145,133 | 3/1979 | Wareham | 354/275 |

FOREIGN PATENT DOCUMENTS

| | | | |
|---|---|---|---|
| 737047 | 7/1943 | Fed. Rep. of Germany | 242/74.2 |
| 379354 | 3/1940 | Italy | 242/74 |

Primary Examiner—Donald A. Griffin
Attorney, Agent, or Firm—Alfred E. Corrigan

[57] ABSTRACT

A photographic film assemblage including a film cassette having a hollow spool or core upon which a strip of film is wound. An end portion of the film is releasably secured to the spool by a release member mounted within the spool. The release member is adapted to prevent the end portion of the film from being detached from the spool during exposure of the film in a camera and to release its hold upon the end portion of the film upon the film assemblage being placed within a film processor, whereby the strip of film may be completely unwound from the spool during processing of the film.

3 Claims, 7 Drawing Figures

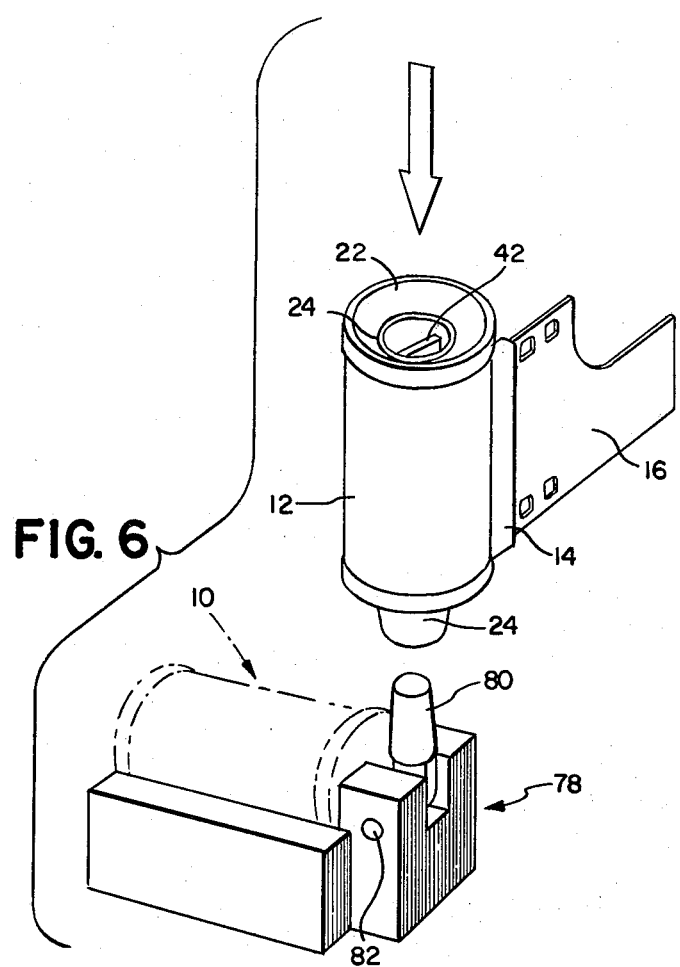
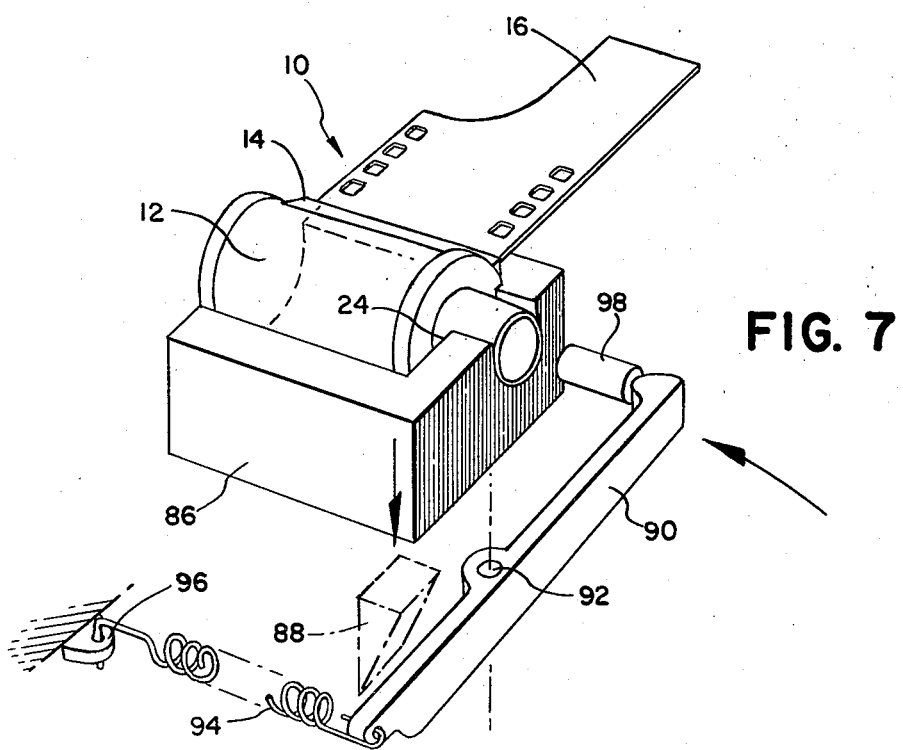

FILM ASSEMBLAGE HAVING FILM RELEASABLY ATTACHED TO FILM SPOOL

BACKGROUND OF THE INVENTION

1. Field of the Invention

This invention relates to a photographic film assemblage including a roll of unexposed film, which assemblage is adapted for use in a hand-held camera.

2. Description of the Prior Art

The present invention relates to a photographic film assemblage including a film cassette, a film supporting spool, and a length of unexposed film wound upon the spool and having one end secured thereto and its opposite end extending to the exterior of the cassette, and more particularly to a film assemblage of the type adapted for use with 35 mm cameras presently on the market.

Film assemblages of the type described above are generally well known and each is adapted to be located within a film cassette compartment in a camera such that the portion of film extending exteriorly of the film cassette may be run across the focal plane of the camera and attached to a film take-up reel. The loading door of the camera is then closed and the individual frames in the film are sequentially exposed as the exposed frames are wound upon the take-up reel. The trailing end of the film is fixedly attached to the spool in the film cassette in order to prevent the complete withdrawal of the film from the cassette during the exposure of the film. After the last frame has been exposed, the film is rewound upon the spool in the cassette until only the leader or leading end section of the film remains outside the cassette. Next, the film assemblage is removed from the camera and the exposed film is processed. During processing, the trailing end of the film is detached from its spool, generally by a film cutting apparatus, such that the remainder of the processing cycle may be carried out. Accordingly, it can be seen that although the securing of the trailing end of the film to the spool prevents the inadvertent, or otherwise, complete withdrawal of the film from the cassette during exposure, one must compensate for it, the securement, by providing the processing apparatus with means for severing the trailing end of the film from the spool.

U.S. Pat. No. 4,145,133 describes a film assemblage having a cassette which rotatably supports a spool having a length of film wound thereupon, but not secured thereto. One problem with this assemblage is that the film may be inadvertently fully withdrawn from the cassette during its exposure thereby rendering the exposed film useless for all practical purposes.

U.S. Pat. No. 3,550,877 discloses a film assemblage including a cassette, a spool rotatably supported within the cassette, and a length of film wound upon the spool. An antibackup shuttle prevents reverse rotation of the spool to unwind the film for processing. The processing apparatus for this film assemblage includes a punch which punctures the side of the cassette and displaces the shuttle axially to an inoperative position. Here again, one has a film processor wherein a severing or cutting operation must be preformed. Not only must one continually maintain the sharpness of the cutting tool in this processor, but also there remains the problem created by fragments of the cassette, caused by the cutting or puncturing operation, entering the processor.

Finally, U.S. Pat. No. 3,978,495 shows a cassette having a spool upon which a length of exposed film is adapted to be wound with one end of the film releasably secured to the spool. However, this cassette is not part of a film assemblage of the type described, nor does it relate to the problem of retaining the trailing end of film in engagement with the spool during exposure of the film in a hand-held camera, and releasing it during processing of the exposed film.

SUMMARY OF THE INVENTION

The instant invention relates to a photographic film assemblage of the type adapted for use in hand-held cameras, preferably of the 35 mm type. The film assemblage includes a film cassette having an exit opening therein, a spool, a length of unexposed film wound upon the spool with a trailing end portion located within a slot in the spool and its opposite end, i.e., the leader or leading end portion, extending to the exterior of the cassette via the exit opening, and a member for releasably securing the trailing end portion of the film to the spool. The securing member is mounted within a passageway in the spool for movement between a first operative position, wherein a protrusion thereon extends into the slot and through an aperture in the trailing end portion of the film so as to retain it in engagement with the spool during the withdrawal of the film during the exposure phase, and a second inoperative position wherein the protrusion has been withdrawn from the aperture in the film and the latter may now be completely withdrawn from the film cassette. Preferably, the movement of the securing member from the first to the second position takes place automatically in response to the operation of a part of a film processor, e.g., closing the loading door of the processor. Alternatively, said movement may be accomplished manually.

An object of the invention is to provide a photographic film assemblage of the type including a roll of unexposed film wound upon and secured to a film spool with means for releasing the attachment therebetween subsequent to the film being photographically exposed and rewound upon the spool.

Another object of the invention is to provide a photographic film assemblage with means for automatically releasing a trailing end of a roll of film from its attachment to a film spool upon the film assemblage being placed in a film processor.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

FIGS. 6 and 7 are perspective views which schematically depict two ways for moving the film securing member from the first to the second position upon being placed in a film processor.

DETAILED DESCRIPTION OF THE INVENTION

Figure 1:
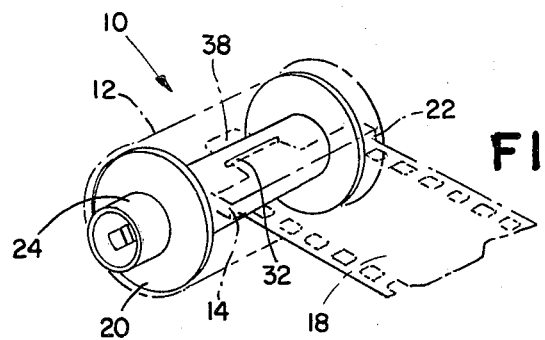
FIG. 1 is a perspective view, partly in phantom, of a photographic film assemblage which embodies the instant invention.

Reference is now made to the drawings wherein is shown a photographic film assemblage 10 which incorporates the instant invention. The film assemblage 10 includes a generally cylindrically shaped film cassette 12 having an exit opening 14 through which a leading end portion 16 of an elongate strip of film 18 protrudes. The open ends of the film cassette 12 are closed by a pair of end caps 20 and 22, each of which is provided with a centrally located aperture for rotatably receiving the journals 24 and 26 of a film spool 28.

The film spool 28 is preferably molded from any suitable plastic material and includes a longitudinally extending passageway 30 which, intermediate its opposite ends, communicates with a slot 32 in a wall 34 of the spool 28 via a radially extending opening 36. The slot 32 is adapted to receive a trailing end portion 38 of the film 18. The wall of the passageway 30 includes a longitudinally extending keyway 40, a flange 42 which extends completely across the passageway 30, a pair of flanges 44 and 46 which extend toward each other and are located in a plane which defines a ninety degree angle with a plane containing the flange 42, and a camming surface 48. A pair of annular flanges 50 and 52 extend radially outward from the wall 34 of the spool 28 so as to provide lateral support for the film 18 which is concentrically wound around the spool 28.

Figure 4:
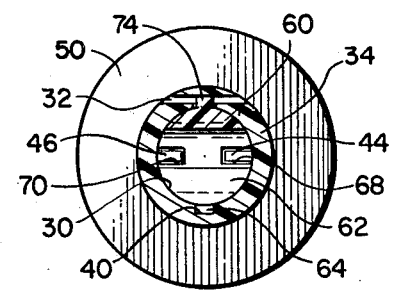
FIG. 4 is an end elevational view taken generally along the line 4—4 of FIG. 3.
Figure 3:
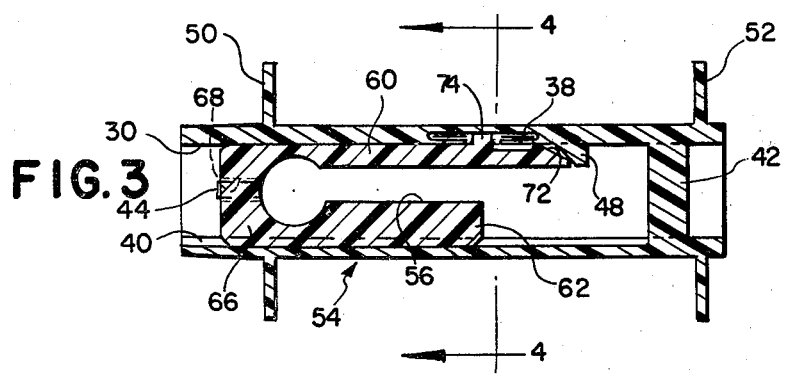
FIG. 3 is a view similar to FIG. 2 with the film securing member located in a first operative position.

The trailing end portion 38 of the film 18 is adapted to be releasably secured to the spool 28 by a securing member 54, which is preferably molded from any suitable plastic material. The member 54 has a generally cylindrical configuration which generally corresponds to a lateral cross section of the passageway 30, as best shown in FIG. 4. The member 54 has an opening 56 which extends laterally therethrough and which is terminated at one end by a generally cylindrically shaped portion 58 so as to provide a generally U-shaped resilient member having legs 60 and 62. The leg 62 is provided with a spline 64, and the end 66 of the securing member is provided with a pair of oppositely spaced keyways 68 and 70. As best seen in FIG. 4, the spline 64 is adapted to be received by the keyway 40, and the keyways 68 and 70 are adapted to receive the flanges 44 and 46, respectively, thereby assuring correct orientation of the securing member 54 with the spool 28. The leg 60 includes an inclined surface 72 at its end and an upwardly extending protrusion 74 which, as shown in FIG. 3, is adapted to extend through the opening 36, into the slot 32 and through an aperture in the trailing end portion 38 of the film so as to fixedly secure it to the spool 28.

Figure 2:
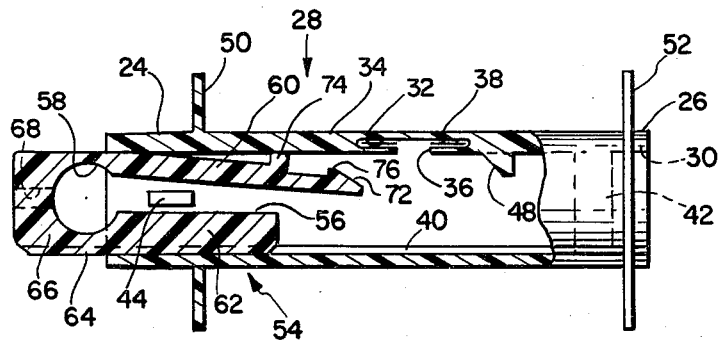
FIG. 2 is a side elevational view, partly in section, of the film spool of the film assemblage with a film securing member being inserted into the film spool.

The securing member 54 is inserted into the left end of the passageway 30, as shown in FIG. 2, and moved to the right into a first operative position, as shown in FIG. 4, wherein the protrusion 74 extends through the aforementioned aperture in the trailing end portion 38 of the film 18 to fixedly secure it to the spool 28.

Figure 5:
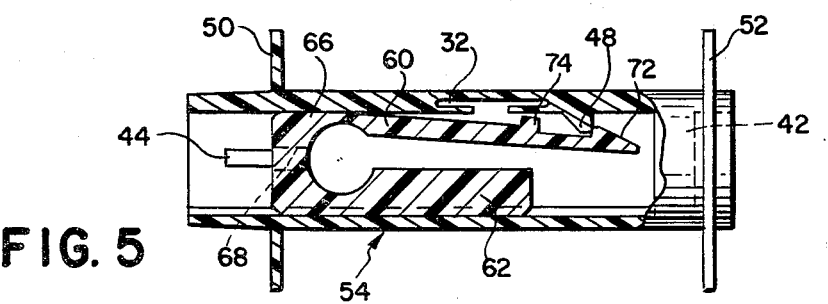
FIG. 5 is a view similar to FIG. 3 showing the securing member in a second, inoperative, or film release position.

After the film assemblage 10 has been placed in a camera and the film 18 completely exposed, a film winding mechanism in the camera engages either the flange 42 or the flanges 44 and 46 and is driven in a direction so as to rewind the exposed film onto the spool 28. Suitable means, not shown, are provided for preventing the leading end portion or leader 16 from being wound into the cassette 12. The film assemblage 10 is then removed from the camera and is ready to be placed in a film processing machine. Prior to being placed in a film processing machine, the securing member 54 may be moved from its first operative position (FIG. 3) to a second, inoperative position (FIG. 5) wherein the protrusion 74 has been completely withdrawn from the aperture in the trailing end portion 38 of the film 18 by a variety of ways. For example, an operator may place a suitably sized dowel into the left end of the spool 28 and force the securing member 54 to the right until the inclined surface 72 on the leg 60 engages the cam 48 and is forced downwardly thereby removing the protrusion 74 from the aperture in the film 18. It will be noted that the width of the opening in the film and the opening 36 is large enough to accommodate the slight movement of the securing member 54 to the right. This movement of the securing member 54 is continued until a high point 76 on the inclined surface 74 is latched behind (to the right) the cam member 48, as shown in FIG. 5. Alternatively, the securing member 54 may be displaced into the second position during the loading of the film assemblage 10 into a film processing apparatus. For example, FIG. 6 shows a portion of a film processing apparatus which includes a cradle 78 having a tapered spindle 80 pivotally mounted about an axis 82 at one end thereon. The operator of the apparatus merely forces the film assemblage 10 onto the spindle 80 such that it enters the passageway 30 and moves the securing member 54 into its second position, from whence it cannot return to the first position. The width of the spindle is less than that of the passageway 30 in order to allow it to clear the flanges 44 and 46. The film assemblage may then be pivoted in a counterclockwise direction, as viewed in FIG. 6, to the dotted line position in which the film may be completely withdrawn from the film cassette 12.

Preferably, the securing member 54 is moved from the first position to the second position in response to the movement of a part of the film processor. For example, as shown in FIG. 7, the film assemblage may be placed in a cradle 86 and the leading end portion 16 of the film 18 operatively connected with another part of the processor, e.g., a take-up reel as described more fully in the copending application Ser. No. 207,362, filed on Nov. 17, 1980, by N. Gold, and assigned in common herewith. The loading door (not shown) of the processor is then closed to initate the processing cycle. A cam 88, extending from the loading door, is moved downwardly into camming engagement with a level 90 to thereby pivot the latter in a counterclockwise direction about a pin 92 and against a return spring 94 which is suitably anchored to the processor at 96. This movement of the lever 90 is effective to move a member 98 having a diameter less than the distance between flanges 44 and 46 into the passageway 30 and move the securing member 54 from the first to the second position.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic film assemblage adapted for use in a hand-held camera, comprising:

a film cassette;

a spool rotatably supported within said film cassette, said spool including means for defining a slot for receiving a trailing end portion of an elongate strip of film, and means for defining a passageway in communication with said slot;

an elongate strip of unexposed film coiled about said spool with a trailing end portion which is adapted to be received within said slot in said spool; and means for releasably securing said trailing end portion of said film to said spool, said securing means including means engageable by an element of a film processor for moving said securing means to a film release position, said securing means being mounted within said passageway for movement between a first operative position, wherein a protrusion thereon extends into said slot and through said trailing end portion of said film so as to secure said trailing end portion to said spool, and a second inoperative or film release position wherein said protrusion of said securing means is no longer extending through said trailing end portion, said securing means further including means cooperative with said spool for preventing the movement of said securing means from said second position to said first position.

2. A photographic film assemblage as defined in claim 1 wherein said securing means is a unitary U-shaped member having a pair of spaced legs and said protrusion extends outwardly from one of said legs.

3. A photographic film assemblage as defined in claim 2 wherein said U-shaped member is located wholly within the confines of said passageway when in said second inoperative position.

* * * * *